US008040333B2

(12) United States Patent
Zhang et al.

(10) Patent No.: US 8,040,333 B2
(45) Date of Patent: Oct. 18, 2011

(54) TYPE OF RADIAL CIRCUIT USED AS LCD DRIVERS

(75) Inventors: Liangtao Zhang, Shenzhen (CN); Yun Yang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 1015 days.

(21) Appl. No.: 11/935,906

(22) Filed: Nov. 6, 2007

(65) Prior Publication Data

US 2008/0150922 A1 Jun. 26, 2008

(30) Foreign Application Priority Data

Dec. 21, 2006 (CN) ...................... 2006 2 0016656 U

(51) Int. Cl.
*G06F 3/038* (2006.01)
*G09G 5/00* (2006.01)

(52) U.S. Cl. ........................... 345/204; 345/87; 345/100

(58) Field of Classification Search ............ 345/87–100, 345/204, 211–213
See application file for complete search history.

(56) References Cited

U.S. PATENT DOCUMENTS

| | | | | |
|---|---|---|---|---|
| 5,272,471 | A * | 12/1993 | Asada et al. | 345/694 |
| 5,543,819 | A * | 8/1996 | Farwell et al. | 345/694 |
| 6,057,809 | A * | 5/2000 | Singhal et al. | 345/3.3 |
| 6,462,728 | B1 * | 10/2002 | Janssen et al. | 345/100 |
| 2004/0095307 | A1 * | 5/2004 | Kim | 345/96 |
| 2005/0162367 | A1 * | 7/2005 | Kobayashi et al. | 345/98 |

* cited by examiner

*Primary Examiner* — Kimnhung Nguyen
(74) *Attorney, Agent, or Firm* — Venture Pacific Law, PC

(57) ABSTRACT

This invention discloses a type of radial circuit for use in driving LCD monitors. The radial circuit includes an odd-even column data generator. The odd-even column data generator receives data from a modulation counter and divides the data into two groups of data having opposite levels: odd column modulation data and even column modulation data. The odd-even column data generator then sends the two sets of data to a comparator comparing the display data and modulation data of the LCD. The comparator is used to control the odd and even columns of the LCD. This utility model divides all the columns in the same row into odd and even columns. An opposite driver voltage waveform is output from between the odd and even columns of the neighboring columns. While the odd columns discharge, the even column recharges. This type of simultaneous discharge and recharge process creates just the right mutual electric charge compensation; and it results in minimizing the electric charge dissipation which saves energy.

18 Claims, 8 Drawing Sheets

TYPE OF RADIAL CIRCUIT USED AS LCD DRIVERS

CROSS REFERENCE

This application claims priority from a Chinese patent application entitled "A Type of Radial Circuit Used in LCD Drivers" filed on Dec. 21, 2006, having a Chinese Application No. 200620016656.3. This Chinese application is incorporated here by reference.

FIELD OF INVENTION

The present invention involves a type of LCD driver circuit and method, and in particular, a type of radial circuit for use as LCD driver circuits.

BACKGROUND

In the current increasingly competitive LCD domain, the IC manufacturers are under tremendous pressure to figure out how to lower power consumption and cost. For the ones who are able to lower chip power consumption, they are viewed as having an advantage with the backend DEMO system manufacturers and thus it would be the winners in the fierce competitive market.

Currently, in the LCD, OLED or other color flat panel technology, using the LCD CSTN display technology as an example, its display relies on a voltage that is applied to the row electrodes and column electrodes in the LCD panel. The differences between the voltages at the electrodes are used to turn on the liquid crystals and hence lighting up the crystals for them to illuminate. During the entire liquid crystals display process, the capacitance created between the row electrodes and column electrodes is turned on sometimes and it is turned off at other times. At the moment of the capacitance being turned on and off, it results in a charge and discharge process that occurs continuously. Being able to control the charge and discharge relationship is extremely crucial to the reduction of power consumption in the system. Considering the liquid crystals response speed and system power consumption issues, the conventional method uses the radial voltage technology to process the driver voltage waveforms outputted from the two neighboring rows of the same column. In other words, in the same column, when the previous row PWM and FRC data changes from 0~31 (5 PWM and 1 FRC, the same reasoning results in other data embedding the PWM modulation method to vary the PWM power from 0 to 2, 6 FRC as 64 frames, and the first to the last frames are 0 to 63 respectively), the PWM and FRC comparative data for the next immediate row is 31~0. The voltage waveforms outputted from comparing the two neighboring rows in the same column can achieve a mutual balance and it is a type of technology that can minimize the flip-flop frequency between voltages. Due to the LCD panel response speed problem, this type of technology can create an excellent display contrast. Meanwhile because the voltage flip-flop frequency is lower, likewise, the IC power consumption is also lower.

A typical display driver circuit is shown in FIG. 1. In the column direction, after an address generator generates the scanning addresses for the SRAM, the system sends the SRAM data to the display data latch. Then the data is compared with the comparator and the compared results are processed through the column driver circuit before outputting the desired driver voltage waveforms to the LCD panel. In the row direction, likewise, after the address generator generates the COM (row) scanning addresses, the row driver circuit produces the desired output driver voltage COM waveforms to the LCD panel. A level selecting circuit is in each of the row driver circuit and column driver circuit.

The comparator is shown in FIGS. 2 and 3, it includes the following parts: a modulation counter generating circuit, a radial circuit, a frame modulation circuit, and a comparator. The processing sequence with respect to the radial circuit and the frame modulation circuit is interchangeable. Part of the working procedure for the entire comparator is as follows: after the modulation counter generating circuit generates a part of the data used in PWM modulation, the data variation is 0~31 sequentially (use 5 PWM as an example); the PWM data is altered through the radial circuit part based on the radial direction method; (processing through the radial circuit before the frame modulation circuit as an example); the data is then processed through the frame modulation circuit where the low position of the PWM data is inserted differently into different FRC data symbols according to the FRC methods; lastly, through the comparator of the displayed data and modulation data, the PWM and FRC modulated data is compared with the displayed data read from SRAM and the corresponding compared results are outputted. Its working principle is: after inputting the data from the modulation counter, part of the radial circuit processes the data based on the odd and even state of the current scanning row. When the scanning row is an odd row, this part of the circuit modulates the data from the modulation counter sequentially from 0~31 to 31~0. When the current scanning row is an even row, this part of the circuit directly sends out the data from the modulation counter as 0~31 sequentially. This type of condition where the neighboring odd and even rows modulation counter output data is opposite can result in an opposite output of the driver voltage waveforms in the odd and even rows of this same column. After the driver voltage waveform of an odd row in any one column changes from high to low, the driver voltage waveform of the next immediate even row changes from low to high, resulting in a radial voltage effect in the row direction.

In the original technology for the LCD column driving methods, since it is only in the column direction where the comparative data from the modulation counter is modulated making it opposite, therefore, only a row direction radial exists. Its waveform is shown in FIG. 7. The output driver voltages in different columns are the same. If at any time the voltage inversion control signal (M) is unchanged, the voltage for the COM direction is V5, the column selecting voltage is V6, the un-selecting voltage is V4. When any one column voltage changes from V6 to V4, the capacitance created at the intersection of the COM (row) and SEG (column) electrodes must discharge. (capacitance second level voltage changes from V5, V6 to V5, V4) The discharge relationship is V5 discharges to V4. Under the condition when the neighboring data is similar, the same change occurs to the neighboring columns of the same row where V5 discharges to V4. This results in the odd columns and even columns to discharge in a uniform direction V4. The V4 then discharges completely and thus part of the discharge electric charge is a complete waste and in the meantime, the current passing through V5 is 2 I (for example); conversely, when any one column voltage changes from V4 to V6, the same thing happens to the neighboring column of the same row where the voltages change from V4 to V6. Then the odd columns and even columns charge V5 in a uniform direction while the current passing through V5 is 2 I. As seen, since the charge and discharge process is absolutely uniform, it is either charging or discharging at a given moment and there is no overlap between the charge and discharge processes; therefore, the electric charge cannot mutually compensate. It eventually causes the voltage flip-flop process to incur significant dissipation of electric charge. This leads to substantial power consumption by the panel and thus inherently high system cost.

SUMMARY OF INVENTION

An object of the present invention is to reducing power consumption with LCD driver chips by introducing a type of radial circuit for use as a LCD driver.

Another object of the present invention is to provide a radial voltage in the column direction, which results in mutual compensation of the charge and discharge of electric charges between neighboring columns which leads to a reduction in power consumption.

Briefly, the present invention discloses a radial circuit that includes an odd-even column data generator and it receives data from a modulation counter and divides the data into two sets of data having opposite levels, odd column modulation data and even column modulation data. The odd-even column data generator then sends the two sets of data to a comparator of the displayed data and modulation data in the LCD. The comparator is used to control the LCD odd and even columns. The odd-even column data generator includes a set of phase inverters. The set of phase inverters is used to input each data from the modulation counter. It then sends out a group of (electric) level and data that is opposite from the modulation counter output data.

The comparative data output control circuit responds to a frame control signal or a timing control signal. At the odd frame or at least at any given time, this circuit sets the odd column data that is sent to the comparator of the displayed data and modulation data as a first level and sets the even column data that is sent to the comparator of the displayed and modulation data as a second level. At the same time in the even frame, it also sets the even column data that is sent to the comparator of the displayed data and modulation data as a second level and sets the odd data that is sent to the comparator of the displayed data and modulation data as a first level. The first level and second level are opposite. A set of PWM comparative data is generated for neighboring odd and even columns and eventually an opposite driver voltage waveform is sent out. This type of simultaneous charge and discharge process creates just the right amount of electric charge compensation which helps minimize the electric charge dissipation and attain the energy saving objective.

An advantage of the present invention is that it reduces power consumption with LCD driver chips by introducing a type of radial circuit for use as a LCD driver.

Another advantage of the present invention is that it provides a radial voltage in the column direction, which results in mutual compensation of the charge and discharge of electric charges between neighboring columns which leads to a reduction in power consumption.

DESCRIPTION OF THE FIGURES

The foregoing and other objects, aspects and advantages of the invention will be better understood from the following detailed description of the preferred embodiments of this invention when taken in conjunction with the accompanying drawings in which.

DETAILED DESCRIPTION OF THE PREFERRED EMBODIMENTS

Figure 1:
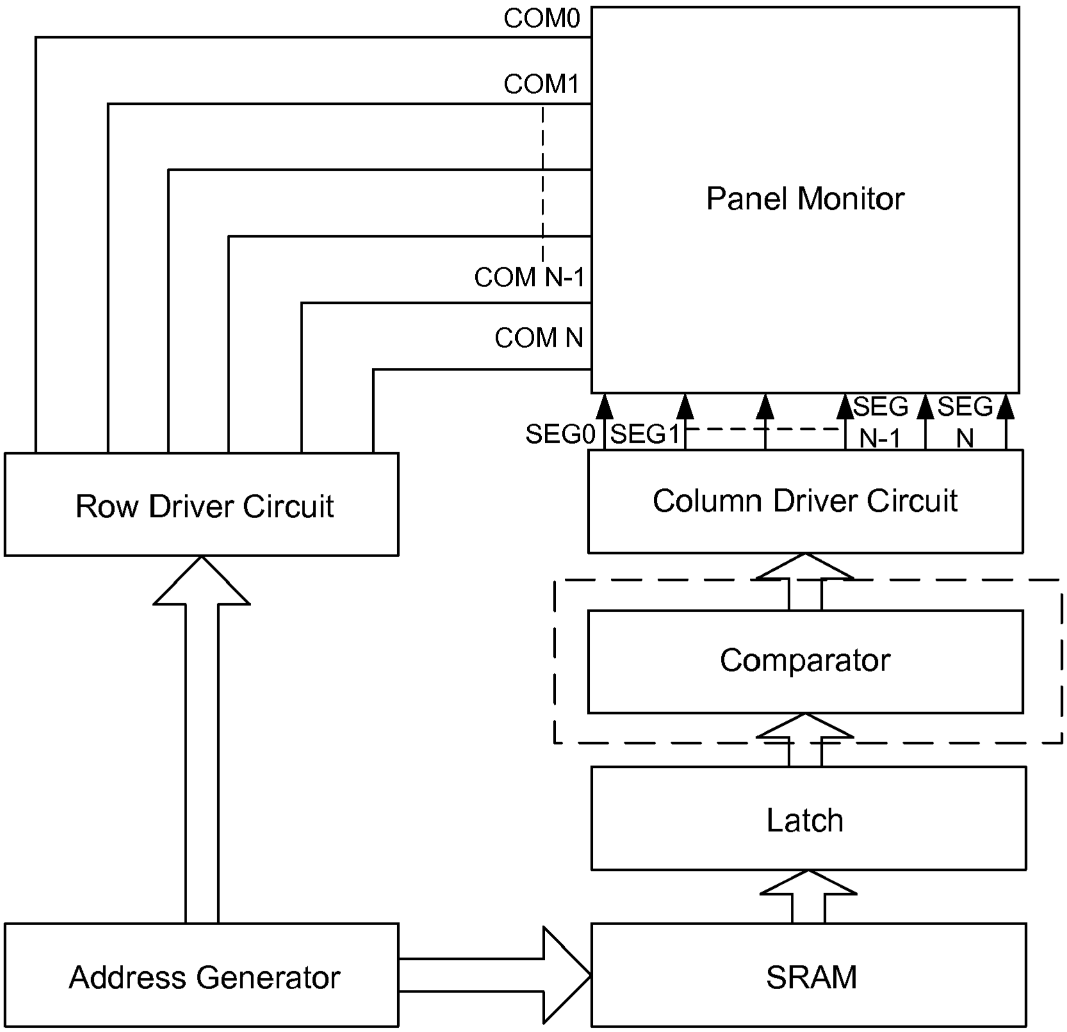
FIG. 1 is a LCD driver circuit block diagram.
Figure 2:
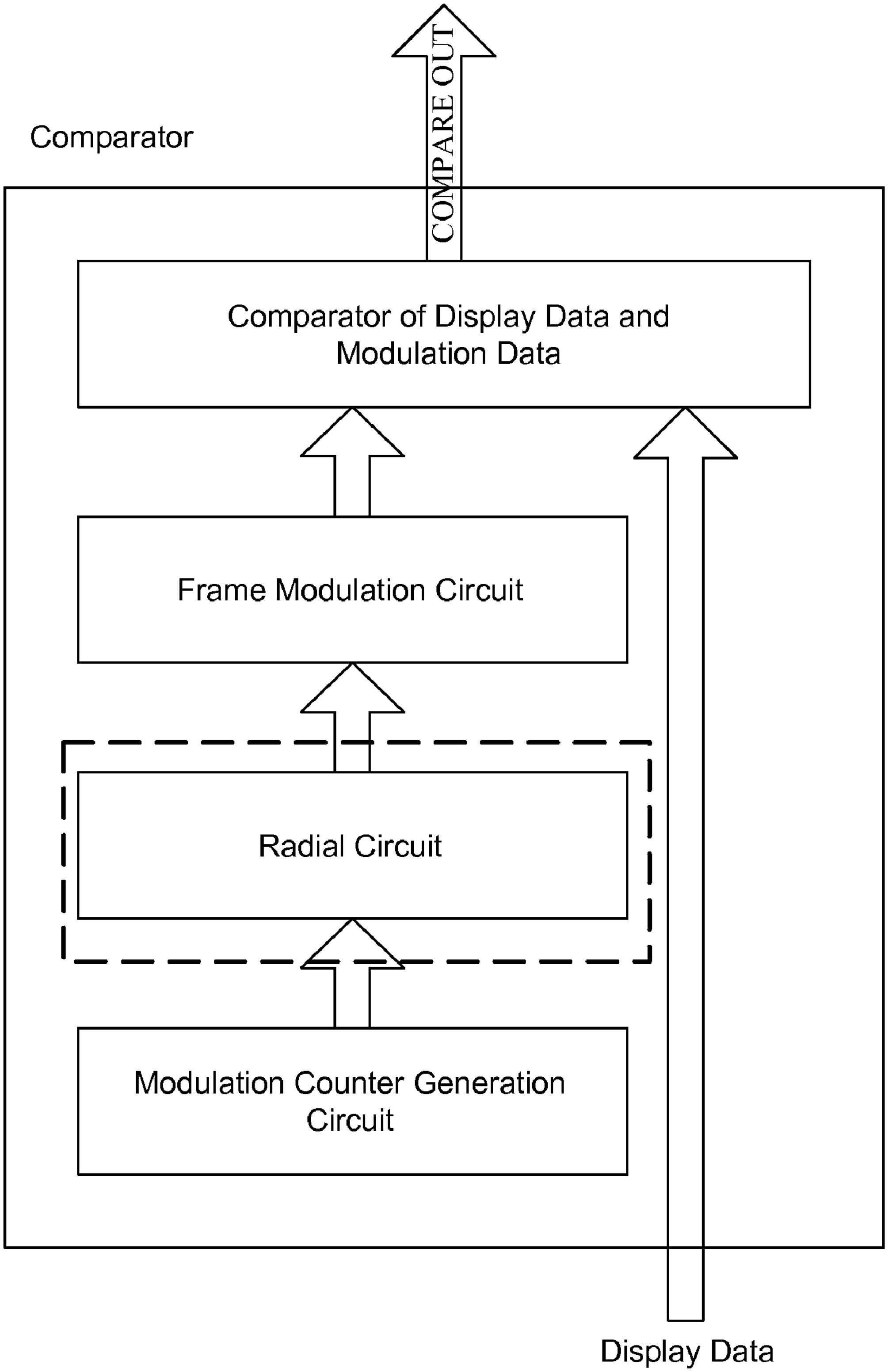
FIG. 2 is a type of embodiment block diagram of the comparator shown in FIG. 1
Figure 3:
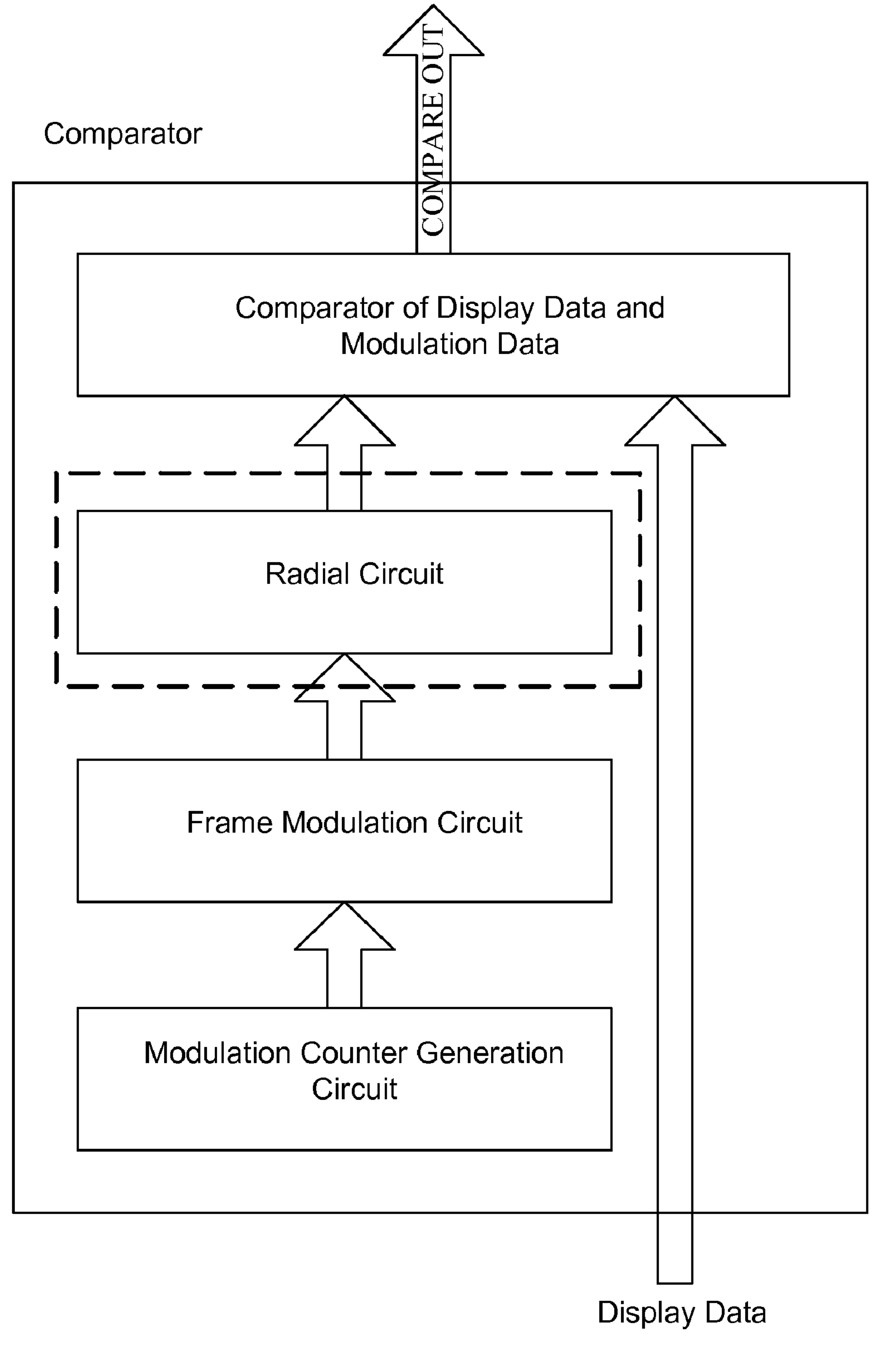
FIG. 3 is another type of embodiment block diagram of the comparator shown in FIG. 1.

This present invention has the following technical proposal for resolving the said technical issues: the radial circuit includes an odd-even column data generator and it receives data from a modulation counter and divides the data into two sets of data having opposite levels, odd column modulation data and even column modulation data. The odd-even column data generator then sends the two sets of data to a comparator of the displayed data and modulation data in the LCD. The comparator is used to control the LCD odd and even columns.

The odd-even column data generator includes a set of phase inverters. The set of phase inverters is used to input each data from the modulation counter. It then sends out a group of (electric) level and data that is opposite from the modulation counter output data.

The radial circuit also comprises of a comparative data output control circuit. The comparative data output control circuit receives the odd modulation data and even modulation data from the odd-even column data generator. Then it timely inverts the phase of the odd column modulation data and even column modulation data before sending it to the comparator of the displayed data and modulation data in the LCD.

The comparative data output control circuit responds to a frame control signal or a timing control signal. At the odd frame or at least at any given time, this circuit sets the odd column data that is sent to the comparator of the displayed data and modulation data as a first level and sets the even column data that is sent to the comparator of the displayed and modulation data as a second level. At the same time in the even frame, it also sets the even column data that is sent to the comparator of the displayed data and modulation data as a second level and sets the odd data that is sent to the comparator of the displayed data and modulation data as a first level. The first level and second level are opposite.

A type of embodiment of the comparative data output control circuit comprises of two sets of multiplexers. In the first set of multiplexers, the first input inputs the odd column data, the second input inputs the even column data, the control responds to the frame control signal or a timing control signal, and the output connects to the comparator of the displayed data and modulation data in the LCD. In the second set of multiplexers, the first input inputs the even column data, the second input inputs the odd column data, the control responds to the frame control signal or a timing control signal, and the output connects to the comparator of the displayed data and modulation data in the LCD.

Another type of embodiment of the control comparative data output circuit comprises of two sets of multiplexers. In the first set of multiplexers, the first input inputs the odd column data, the second input inputs the even column data, the control responds to the frame control signal or a timing control signal, and the output connects to the comparator of the displayed data and modulated data in the LCD. In the second set of multiplexers, the first input inputs the odd column data, the second input inputs the even column data, the control responds to the opposite phase signal of frame control signal or a timing control signal, and the output connects to the comparator of the displayed data and modulated data in the LCD.

This present invention has the following benefits: 1) based on the original LCD driver methods, this present invention changes the PWM and FRC comparative data between the neighboring columns and neighboring frames in order to achieve the goal of power consumption reduction. This invention divides all the columns in the same row into two sets of odd and even columns. A set of PWM comparative data is generated from between each neighboring odd and even column and eventually sends out an opposite driver voltage waveform. This guarantees the odd and even column voltage flip-flop non-uniformity where the odd column discharges while the even column charges. This type of simultaneous charge and discharge process creates just the right amount of electric charge compensation which helps minimize the electric charge dissipation and attain the energy saving objective. 2) When the columns of the same row are divided into two sets of odd and even columns, the frames are also divided into odd and even frames. In other words, it also guarantees the neighboring frames to be non-uniform; in the first frame, the odd column discharges while the even column charges; in the second frame, it is the exact opposite where the odd column charges when the even column discharge. Repeating this process can avoid generating direct current between different columns in different frames leading to better prevention of dissipation of electric charge.

Embodiment 1, this embodiment improves the radial circuit based on the existing technology. The radial circuit of this embodiment includes an odd-even column data generator. The odd-even column data generator receives data from the modulation counter and divides the data into two sets of data having opposite levels, odd column modulation data and even column modulation data. Then the odd-even column data generator sends the two sets of data to a comparator of the displayed data and modulation data in the LCD. The comparator is used to control the LCD odd and even columns.

Figure 5:
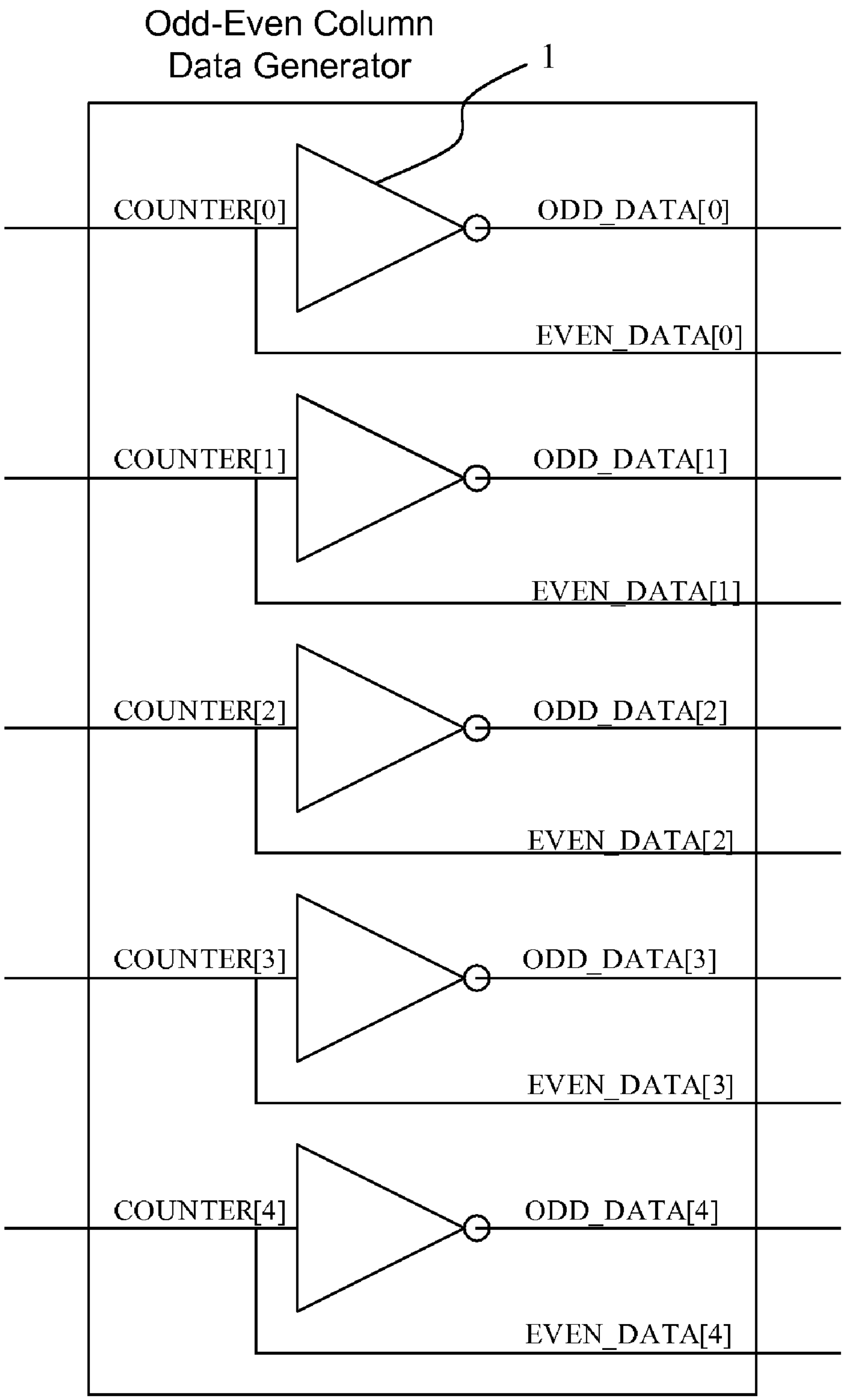
FIG. 5 is a type of embodiment block diagram of odd-even column data generator.

An embodiment of the odd-even column data generator uses a phase inverters in its implementation. As shown in FIG. 5, the odd-even column data generator includes a set of phase inverters 1 and each phase inverter correspondingly inputs COUNTER data from the modulation counter. It then sends out a group of level and data that is opposite from the modulation counter output data. Thus, the odd-even column data generator outputs two groups of data: one group uses the COUNTER data from the modulation counter directly as the EVEN_DATA; the other group uses the inverted data from the modulation counter as the ODD_DATA. Thus, the levels of the two groups are opposite and they are sent to the comparator of the displayed data and modulation data in the LCD. The comparator is used to control the odd columns and even columns in the LCD causing the odd columns to discharge while the even columns charge or causing the odd columns to charge while the even column discharge. This forms a radial voltage in the column direction resulting in the realization of a mutual electric charge compensation of the charge and discharge process in the neighboring two columns and thus leading to lower system power consumption.

Figure 4:
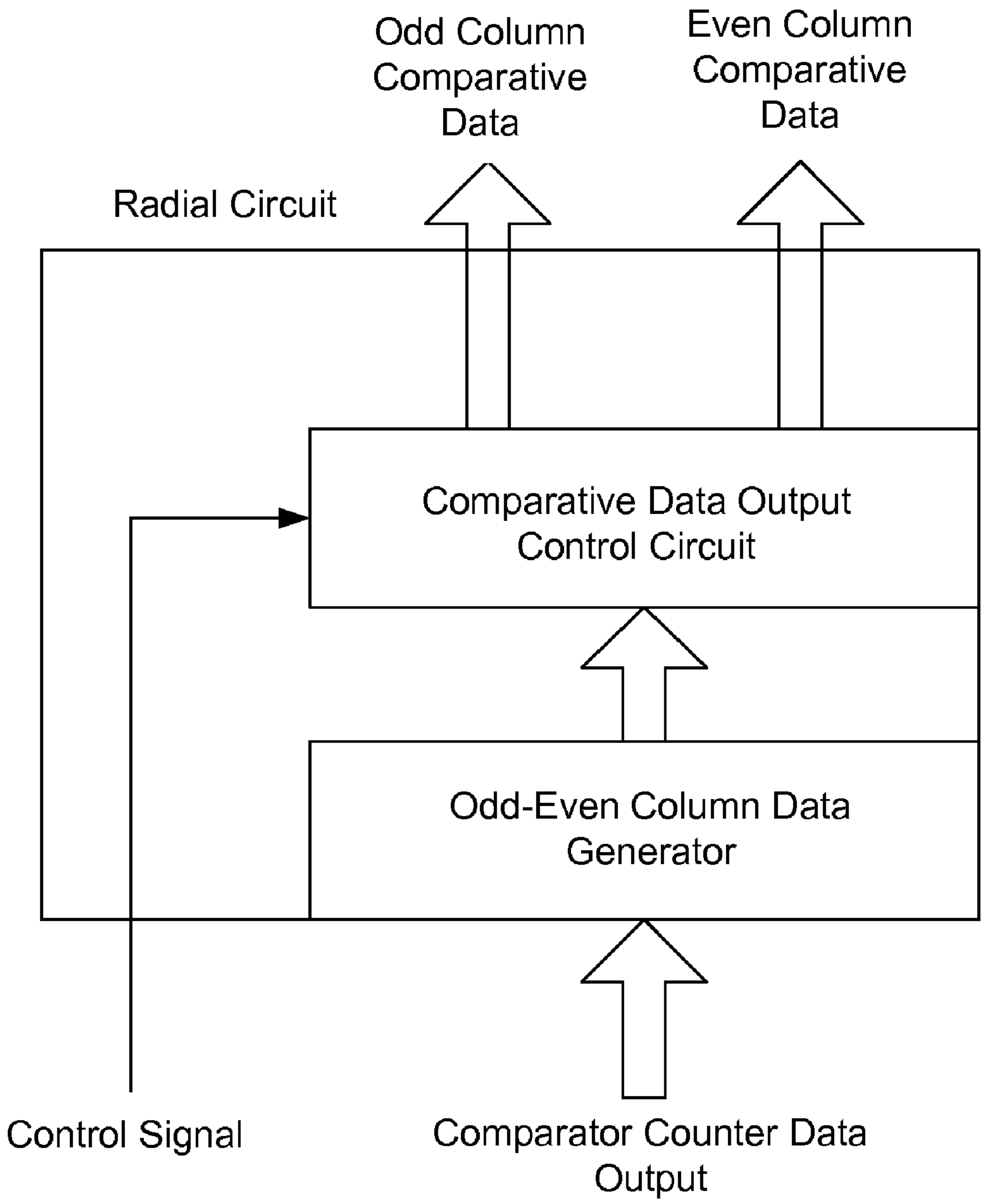
FIG. 4 is a type of embodiment block diagram of the radial circuit.

In the second embodiment, in order to avoid generating direct current in the same column and causing electric charge dissipation, a comparative data output control circuit is added to the basis of embodiment 1. The comparative data output control circuit receives the odd column data and even column data from the odd-even column data generator. Then it timely inverts the phase of the odd column data and even data before sending it to the comparator of the displayed data and modulation data in the LCD. A type of embodiment of a comparative data output control circuit is shown in FIG. 4. The comparative data output control circuit responds to a frame control or other timing control signal. At an odd frame, this circuit sets the odd column data that is sent to the comparator of the displayed data and modulation data as a first level and sets the even column data that is sent to the comparator of the displayed and modulation data as a second level. At the same time in an even frame, it also sets the odd column data that is sent to the comparator of the displayed data and modulation data as a second level and sets the even column data that is sent to the comparator of the displayed data and modulation data as a first level. The first level and second level are opposite.

Figure 6:
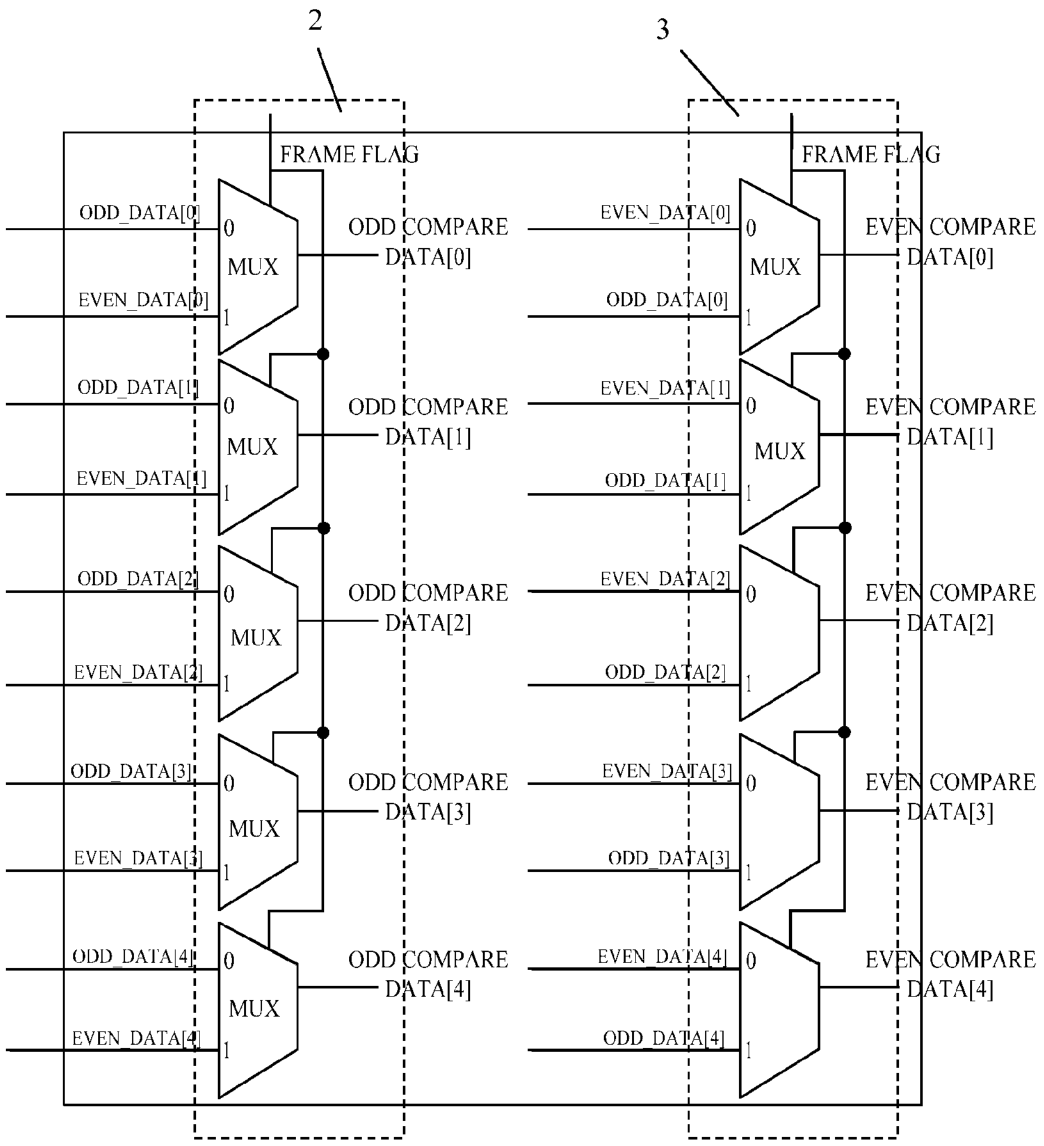
FIG. 6 is a type of embodiment block diagram of the comparative data output control circuit.
Figure 7:
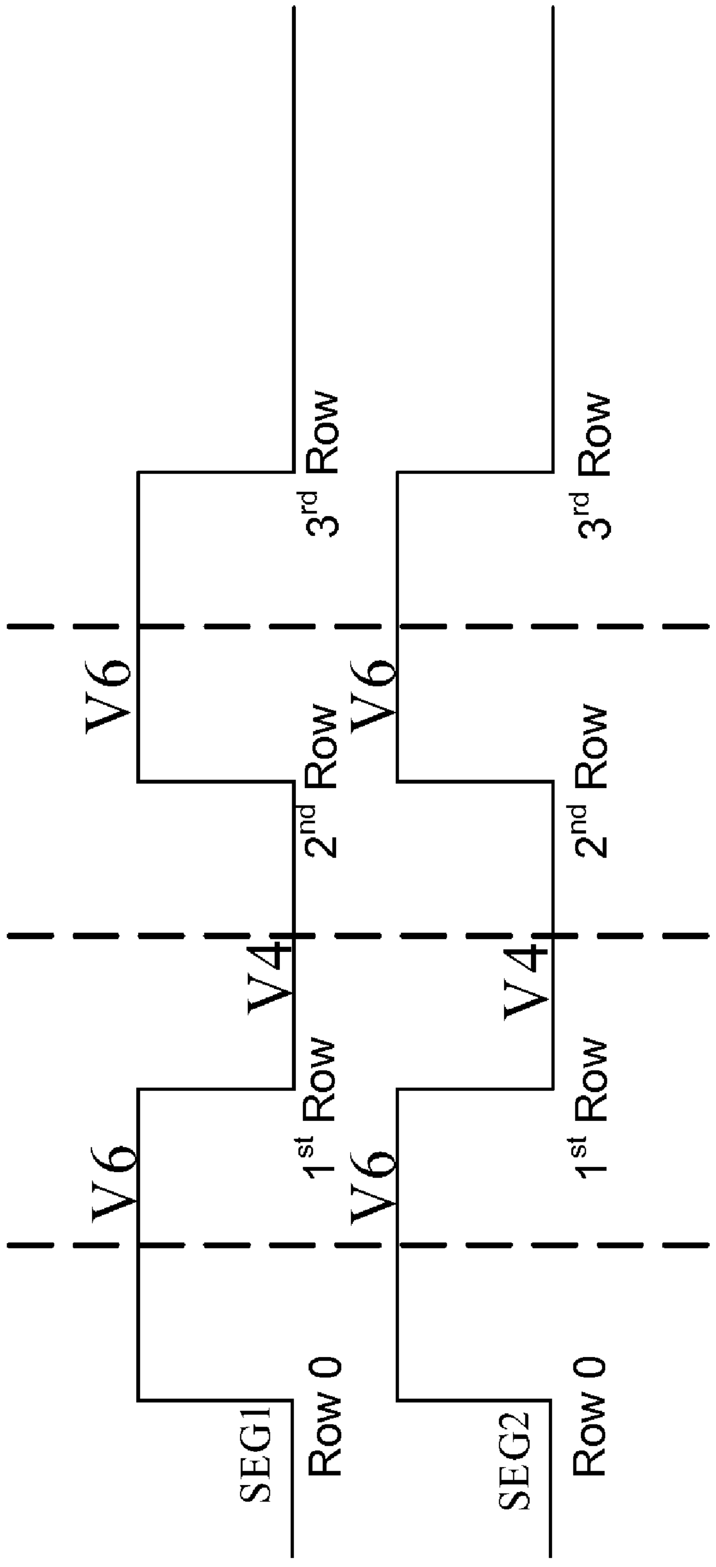
FIG. 7 is a driver voltage waveform of the conventional technology.

A type of embodiment of the comparative data output control circuit is shown in FIG. 6. It comprises of two sets of multiplexers. In the first set of multiplexers 2, the first input inputs the odd column data ODD_DATA, the second input inputs the even column data EVEN_DATA, the control responds to the frame control signal FRAME FLAG or other timing control signal, and the output connects to the comparator of displayed data and modulation data in the LCD. In the second set of multiplexers 3, the first input inputs the even column data EVEN_DATA, the second input inputs the odd column data ODD_DATA, the control corresponds to the frame control signal FRAME FLAG or other timing control signal, and the output connects to the comparator of the displayed data and modulation data in the LCD.

Another type of embodiment of the comparative data output control circuit comprises of two sets of multiplexers. In the first set of multiplexers, the input inputs the odd column data, the second input inputs the even column data, the control responds to the frame control signal or other timing control signal, the output connects to the comparator of the displayed data and modulation data in the LCD; in the second set of multiplexers, the first input inputs the odd column data, the second input inputs the even column data, the control responds to the opposite signals of the frame control signal or other timing control signal, and the output connects to the comparator of the displayed data and modulation data in the LCD.

A LCD driver is one that effectively controls the row driver circuit and column driver circuit so that the added COM and SEG in the LCD panel can generate an effective liquid crystals switch capacitance. The display control of the liquid crystals is realized by controlling the charge or discharge process of this capacitance. This present invention precisely employs the control of the charge and discharge of this capacitance to realize the display control of the liquid crystals. The following uses CSTN as an example to explain the principle of this embodiment. In the CSTN type of LCD, the COM and SEG can choose from six different voltage levels, listing from high to low are: V6, V5, V4, V3, V2, and V1. The COM selected levels can be V6, V1 and the unselected levels can be V2, V5; the SEG selected levels can be V1, V6 and the unselected levels can be V3, V4 (all are selected according to the voltage flip-flop signal M).

In FIG. 5, the data inputted into the comparator counter of the radial circuit is divided into two groups: one group forms the odd column comparative data and one group forms the even column comparative data; the two groups of data are opposite. When the odd column comparative data is 0~31, the even column comparative data is 31~0 (using 5+1 PWM and FRC as an example). Under this condition, when the frame signal or other timing control signal change occurs, the odd column and the even column comparative data undergo an opposite change again, as shown in FIG. 6. In the case of an odd frame (using frame control signal as an example), if the odd frame control signal FRAME FLAG is 0, then the odd column of the last SEG comparative data outputs ODD_DATA while the even column outputs EVEN_DATA; in the case of an even frame, the odd column of the last SEG comparative data outputs the EVEN_DATA while the even column outputs the ODD_DATA. As a result, it not only attains the non-uniformity of the odd columns and even columns, it also guarantees the non-uniformity of the odd frames and even frames.

Figure 8:
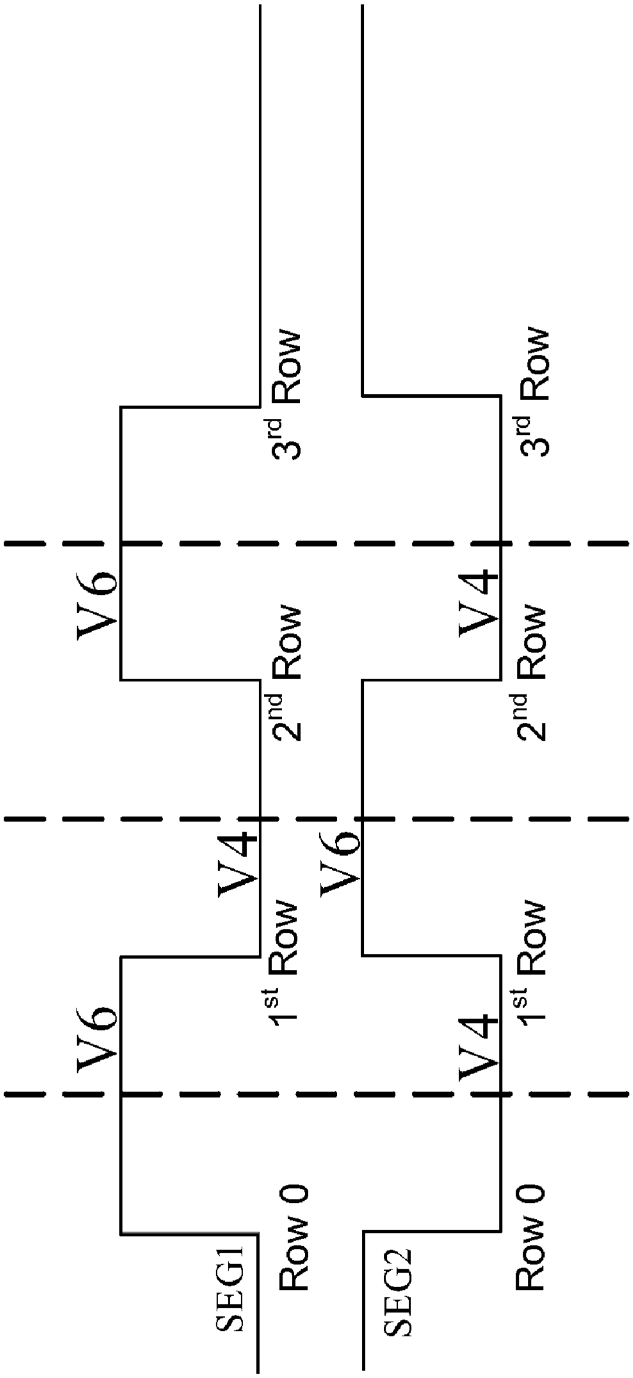
FIG. 8 is an illustration of the driver voltage waveform of this present invention.

Per aforementioned, the column driver circuit generates an output of completely opposite driver voltages for the odd columns and even columns. It also generates a completely opposite driver waveforms for the same columns between the odd frames and even frames. The waveform diagram is shown in FIG. 8. If the voltage flip-flop signal M is set, SEG selected voltage is V6 and the unselected voltage is V4 while the COM selected voltage is V1 and unselected voltage is V5. Because during the liquid crystal scanning process, the COM direction only has one selected COM at any given time; therefore for the ease of consideration, if all the COM are not yet selected, its voltage is the unselected voltage V5. In the odd frame, when one column voltage changes from V6 to V4, V5 discharges to V4 since the COM voltage is V5. As a result, a current channel is formed. It differs from the original technology in that, at this time, the voltage changing directions of the neighboring columns are exactly opposite where V4 changes to V6 and V6 charges to V5. Thus, another current channel is formed. The changing directions of the two current channels of these two columns are precisely opposite and since the changes occur simultaneously, it results in a current loop. Compared to the original technology, the current passing through the V5 point is reduced to I which is ½ of the original. Likewise, when one column voltage changes from V4 to V6, the system charges to V5; however, the voltage of its neighboring columns also changes from V6 to V4 and discharges to V5. As a result, an electric charge mutual compensation occurs with the previous column that charges to V5 resulting in a current loop. Compared to the original technology, the current passing through the V5 point is reduced to I which is also ½ of the original. In the even frame, since its comparative data is exactly opposite from the odd frame, their change and discharge situation is also reversed. Thus, where one column charges in the original odd frame, it discharges in the current even frame; where one column discharges in the original odd frame, it charges in the current even frame. This type of driver method is excellent in preventing the direct current phenomenon between the frames and uniformity between neighboring columns. Thus it not only guarantees non-uniformity between frames, it also guarantees non-uniformity between neighboring columns. Therefore, in this invention, regardless of odd frame or even frame, the voltage changing directions of half of the columns in the same row change from V6 to V4 direction while the other half change from V4 to V6 direction. In other words, half of which discharge V5 to V4 while the other half charge V5 to V6. Since their charge and discharge processes are concurrent, the charge and discharge electric charge can mutually compensate reducing the electric charge passing through V5 to half as a result. This method realizes the complete radial direction of the odd column and even column voltages and it also realizes non-uniformity of their output voltages. The current represents in V6 decreases and thus the power consumption represents in the liquid crystals also significantly reduces.

When the control voltage flip-flop signal M changes, the SEG voltage does not change from V6 to V4; instead, it changes from V1 to V3. The COM unselected voltage is V2 and the selected voltage is V6 and the same sample COM voltage is always the unselected voltage V2. When one column SEG voltage changes from V1 to V3, the COM electrode and SEG electrode capacitance charges and V3 charges to V2. Meanwhile, the neighboring column SEG voltage is exactly opposite where V3 changes to V1 and V2 discharges to V1. Likewise in the odd frame and even frame, the column change relationship is also opposite. Per said explanation, this method ultimately guarantees non-uniformity between the odd columns and even columns and it also guarantees non-uniformity between the odd frames and even frames; thus it fulfills the voltage sharing and energy saving objectives.

The comparative data output control circuit can also use other signal to control the selection of the multiplexers. For example, a set period of level is generated from a timer and that particular level becomes the control signal for the control comparative data output circuit. As a result, it helps solve the technical issue that this present invention intends to solve.

In summary, since this present invention utilizes the frame control odd and even column comparative data method, it allows the comparative data of the odd and even columns to change in certain opposite order in accordance with certain timing. This type of opposite change of comparative data between neighboring columns directly causes their ultimate driver voltage output to show radial form. The changing directions of the driver voltages generated by the odd and even columns are completely opposite; when the odd column charges (discharges), the even column discharges (charges). Thus, it ensures mutual compensation of the electric charge that effectively reduces the power consumption by the LCD panel.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinary skilled in the art.

We claim:

1. A radial circuit for driving a LCD monitor, comprising:

a modulation counter;

an odd-even column data generator receiving data from the modulation counter; and a comparative data output control circuit, wherein the comparative data output control circuit receives odd modulation data and even modulation data from the odd-even column data generator and outputs to the LCD monitor, wherein the odd-even column data generator includes a set of phase inverters for receiving data from the modulation counter and for sending out a group of levels and data that is opposite from the data from the modulation counter, and wherein the comparative data output control circuit inverts the phase of the odd modulation data and even modulation data before sending it to a comparator for comparing displayed data for the LCD monitor and the modulation data.

2. The circuit of claim 1 wherein the comparative data output control circuit responds to a frame control signal.

3. The circuit of claim 2 wherein on odd frames, the odd column data is set to a first level, and the even column data is set to a second level, wherein said first level and said second level are opposite.

4. The circuit of claim 3 wherein on even frames, even column data is set to a first level and odd column data is set to a second level, wherein said first level and said second level are opposite.

5. The circuit of claim 2 wherein on even frames, even column data is set to a first level and odd column data is set to a second level, wherein said first level and said second level are opposite.

6. The circuit of claim 1 wherein the odd-even column data generator includes a set of phase inverters and each phase inverter correspondingly inputs counter data from the modulation counter and sends out a group of levels and data that is opposite from data from the modulation counter.

7. The circuit of claim 1 wherein a comparator is used to control the odd columns and even columns in the LCD causing the odd columns to discharge while the even columns charge or causing the odd columns to charge while the even column discharge.

8. The circuit of claim 7 wherein a radial voltage is formed in the column direction resulting in the realization of a mutual electric charge compensation in the charge and discharge process in neighboring columns.

9. The circuit of claim 1 wherein the comparative data output control circuit responds to a frame control signal, wherein for a first frame, the comparative data output control circuit sets the first column data at a first level and sets the second column data at a second level, wherein the first level and second level are opposite.

10. The circuit of claim 9 wherein the first column data at the first level and the column data at the second level forms are neighboring columns and are charged and discharged to form a current loop, wherein such current loop controls the display of the LCD monitor.

11. The circuit of claim 10 wherein there is mutual compensation of electric charges between neighboring columns that effectively reduces the power consumption by the LCD monitor.

12. A radial circuit for driving a LCD monitor, comprising:
- a modulation counter;
- an odd-even column data generator receiving data from the modulation counter; and
- a comparative data output control circuit, wherein the comparative data output control circuit receives odd modulation data and even modulation data from the odd-even column data generator and outputs to the LCD monitor;
- wherein the comparative data output control circuit responds to a frame control signal;
- wherein for a first frame, the comparative data output control circuit sets the first column data at a first level and sets the second column data at a second level, wherein the first and second levels are opposite, and wherein the comparative data output control circuit inverts the phase of the odd modulation data and even modulation data before sending it to a comparator for comparing displayed data for the LCD monitor and the modulation data.

13. The circuit of claim 12 wherein the first column data at the first level and the column data at the second level are neighboring columns and are charged and discharged to form a current loop, wherein such current loop controls the display of the LCD monitor.

14. The circuit of claim 13 wherein there is mutual compensation of electric charges between the neighboring columns to reduce power consumption by the LCD monitor.

15. The circuit of claim 12 wherein a comparator is used to control the odd columns and even columns in the LCD causing the odd columns to discharge while the even columns charge or causing the odd columns to charge while the even column discharge.

16. The circuit of claim 15 wherein a radial voltage is formed in the column direction resulting in mutual electric charge compensation between the neighboring columns in the charging and discharging processes.

17. A radial circuit for driving a LCD monitor, comprising:
- a modulation counter;
- an odd-even column data generator receiving data from the modulation counter; and
- a comparative data output control circuit, wherein the comparative data output control circuit receives odd modulation data and even modulation data from the odd-even column data generator and outputs to the LCD monitor;
- wherein the comparative data output control circuit responds to a frame control signal;
- wherein for a first frame, the comparative data output control circuit sets the first column data at a first level and sets the second column data at a second level, wherein the first level and second level are opposite;
- wherein the first column data at the first level and the column data at the second level forms are neighboring columns and are charged and discharged to form a current loop, wherein such current loop controls the display of the LCD monitor; and there is mutual compensation of electric charges between neighboring columns reduce power consumption by the LCD monitor.

18. The circuit of claim 17 wherein a radial voltage is formed in the column direction resulting in mutual electric charge compensation between the neighboring columns in the charging and discharging processes.

* * * * *